Nov. 7, 1961     D. H. KEISER, JR     3,007,245
DEVICE FOR CUTTING OR TRIMMING GRASS AND OTHER GROWTHS
Filed Dec. 31, 1959     3 Sheets-Sheet 1

INVENTOR:
David H. Keiser, Jr.,
BY Alfred E. Ischinger
ATTORNEY.

Nov. 7, 1961　　　　D. H. KEISER, JR　　　　3,007,245
DEVICE FOR CUTTING OR TRIMMING GRASS AND OTHER GROWTHS
Filed Dec. 31, 1959　　　　　　　　　　3 Sheets-Sheet 2

INVENTOR:
David H. Keiser, Jr.,
BY
Alfred E. Ischinger
ATTORNEY.

Nov. 7, 1961 D. H. KEISER, JR 3,007,245
DEVICE FOR CUTTING OR TRIMMING GRASS AND OTHER GROWTHS
Filed Dec. 31, 1959 3 Sheets-Sheet 3
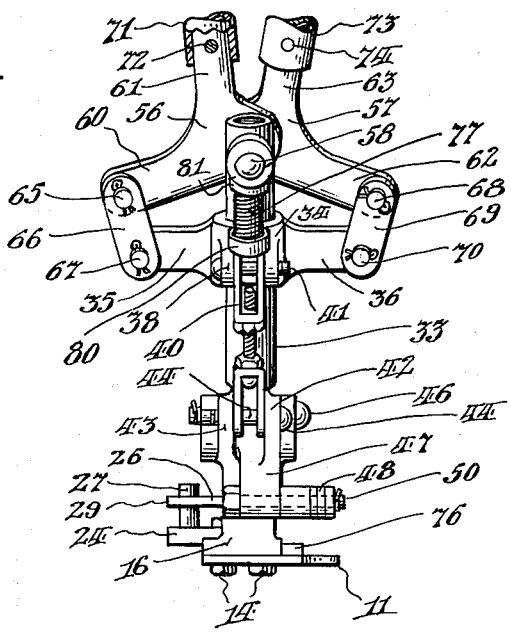
FIG. 5.
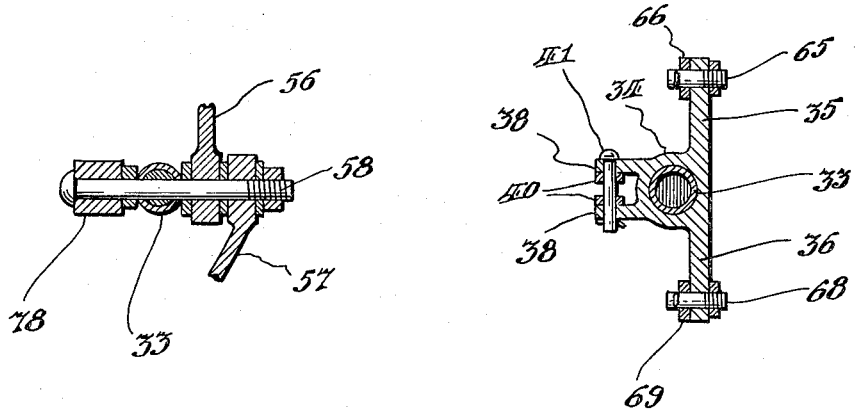
FIG. 6.
FIG. 7.
INVENTOR:
David H. Keiser, Jr.,
BY
Alfred E. Irchinger
ATTORNEY.

United States Patent Office 3,007,245
Patented Nov. 7, 1961

3,007,245
DEVICE FOR CUTTING OR TRIMMING
GRASS AND OTHER GROWTHS
David H. Keiser, Jr., Wyomissing Hills, Pa.
(53 Park Road, West Lawn, Pa.)
Filed Dec. 31, 1959, Ser. No. 863,219
1 Claim. (Cl. 30—248)

This invention relates to shears or devices for cutting or trimming grass or other growths of lawns and the like, and more particularly concerns a device of this type which can be easily and conveniently carried as well as operated by both hands of an individual while standing in a substantially erect or vertical position with arms extended downwardly and forwardly in a natural and comfortable manner. The present invention constitutes a related advancement over the invention of my U.S. Patent No. 1,845,798 which was issued February 16, 1932.

One object of my invention is to provide a novel device of the type indicated.

Another object is to provide such a device which has certain structural and functional features of advantage over the similar prior art devices.

A further object is to provide such a device which comprises a unique, compact and sturdy grass cutting unit of substantially right-angular configuration and a special elongated handle arrangement that facilitates the carrying and operation of the unit in a certain novel manner.

Another object is to provide such a device in which the said unit includes a pair of cooperatively mounted grass cutting blades that are positionable in adjacent substantially parallel relation above the ground and have cooperatively combined therewith a novel mechanism for effecting grass cutting operation thereof.

Another object is to provide such a device in which the said special elongated handle arrangement includes two long handle members that are pivotally connected to the upper portion of the unit in such manner as to enable reciprocating unit operating movement thereof toward and from each other, and that are arranged to extend from the unit to a location within easy grasping reach of both hands of the device operator while standing in a substantially vertical position with arms extended downwardly and forwardly in a natural and comfortable manner so as to facilitate two hand carrying and two hand operation of the device as well as easy sighting of the work performed by the device.

An additional object is to provide such a device in which the said special elongated handle arrangement enables the application of a substantially maximum leverage force or actuating power to the operating action of the grass cutting unit.

With these and other objects in view, which will become more readily apparent from the following detailed description of the practical and illustrative improvements shown in the accompanying drawings, my invention comprises the novel shears or grass cutting device, elements, features of construction and arrangement of parts in cooperative relationship, as more particularly indicated and defined by the hereto appended claims.

In the drawings:

FIG. 5 is a rear elevational view of the structure shown in FIG. 3.

FIG. 6 is a sectional view taken substantially as indicated by the arrows 6—6 on FIG. 3 and, FIG. 7 is a sectional view taken substantially as indicated by the arrows 7—7 on FIG. 3.

Figure 1:
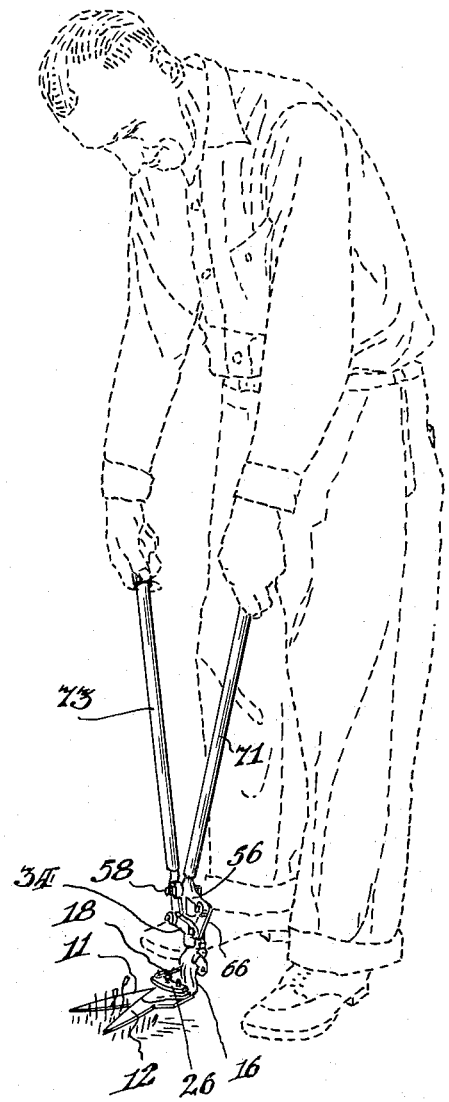
FIGURE 1 is a perspective view of one form of grass cutting device in accordance with my invention and shows the manner of its use by an operator of the device.

Referring to the drawings, the form of shears, lawn trimmers, or grass clippers there shown comprises two grass cutting blades 11 and 12, the blade 11 being fixed, and the blade 12 being superimposed on the fixed blade and having pivotal connection with said fixed blade for movements relative thereto.

The rear end of the grass cutting blade 11 is rigidly fixed by means of rivets or bolts 14 to the lower substantially horizontally disposed extension 15 of a blade carrier bracket 16.

Figure 3:
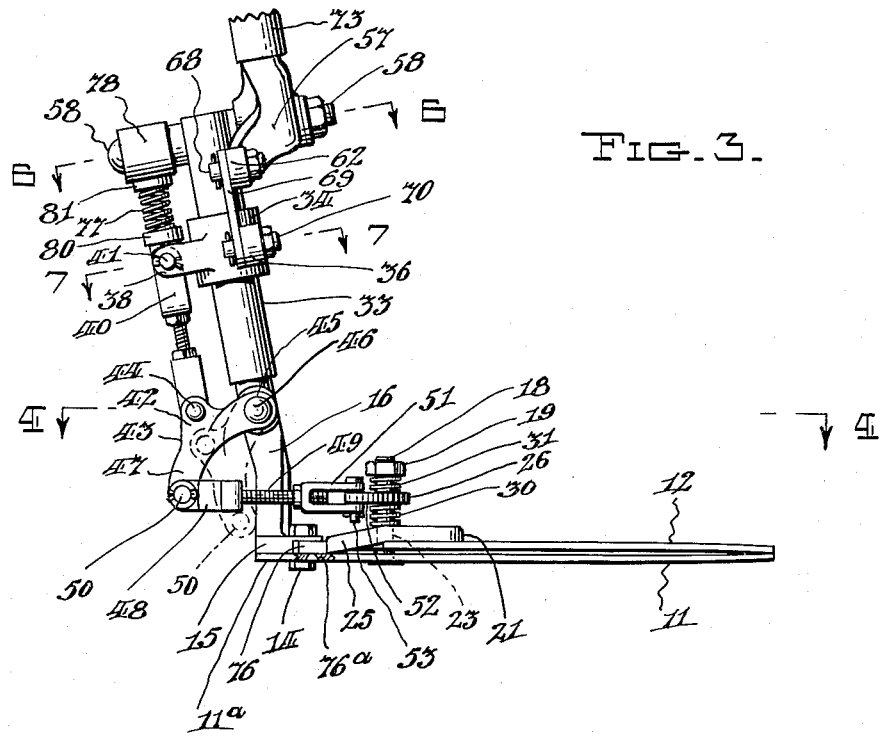
FIG. 3 is an elevational view of the lower part of the device, as seen from the opposite side to that shown in FIG. 2.

As shown in FIG. 3, the main body of the blade carrier bracket 16 is arranged at substantially right angles with respect to the extension 15 thereof, so that, when the extension is disposed in a substantially horizontal position, the main body of the bracket 16 will extend vertically upwardly therefrom for a suitable distance.

Fixedly secured to the blade 11 and projecting upwardly therefrom a suitable distance, is a stud 18 having its upper end formed with screw threads for the reception of a nut 19.

Figure 4:
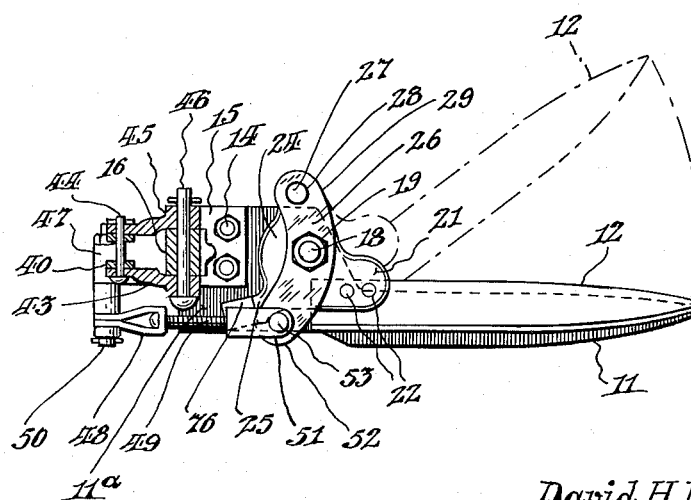
FIG. 4 is a sectional plan view, taken substantially as indicated by the arrows 4—4 on FIG. 3.

The rear end of the movable grass cutting blade 12 is rigidly connected to a bracket 21 by means of rivets or other similar fastening means 22 (FIG. 4).

The bracket 21 has a hole 23 formed therein for the stud 18, and it is by this means that the movable grass cutting blade 12 has pivotal connection with the fixed grass cutting blade 11. To effect a free and somewhat loose pivotal connection of the movable grass cutting blade 12 with the fixed grass cutting blade 11 the diameter of the hole 23 is made slightly larger than the diameter of the stud 18. This construction is old in the art and provides a non-binding pivotal connection insuring a proper pressure engagement of the blade cutting edges during their closing movement with relief of such pressure during their opening movement, as explained in detail in my Patents Nos. 2,281,977, 2,607,114 and 2,661,534 which were issued respectively on May 5, 1942, August 19, 1952 and December 18, 1953.

Rearwardly with respect to its connection with the movable grass cutting blade 12, the bracket 21 is formed with lateral extensions 24 and 25, the extension 24 being at one side of the hole 23, and the extension 25 being at the opposite side of said hole.

Mounted on the stud 18 and arranged a suitable distance above the bracket 21 of the movable grass cutting blade 12 and also arranged a suitable distance below the nut 19, is a lever plate 26 which extends laterally at each side of the stud 18 and overlies the two extensions 24 and 25 of the bracket 21.

Fixedly mounted on the bracket 21 and projecting upwardly from the extension 24 thereof, is a pin 27 which extends through a hole 28 of somewhat greater diameter than the pin 27, formed in one end portion 29 of the plate 26.

Encircling the stud 18 and bearing at one end against the bracket 21 and bearing at its opposite end against the plate 26, is a coiled spring 30. Also encircling the stud 18 and bearing at one end against the nut 19 and bearing at its opposite end against the plate 26, is a second coiled spring 31. Thus, the construction and arrangement of the parts is such that the plate 26 is resiliently supported on the stud 18 between the two springs 30 and 31 in spaced relation above the movable grass cutting blade 12, so that, through the action of said springs, the desired cutting pressure is applied to the movable grass cutting blade 12. It will be understood that the desired cutting pressure may be obtained by adjusting the position of the nut 19 on the stud 18 to either increase or decrease the forces applied by the springs 30 and 31 to the movable cutting blade 12.

The mechanism for effecting grass cutting operation of the blades 11 and 12 is arranged above the latter and includes a shaft 33 fixedly secured to the upper end portion of the blade carrier bracket 16 and projecting upwardly therefrom a suitable distance.

A vertically movable element in the form of a crosshead 34 is slidably mounted on the shaft 33, said crosshead having a pair of arms 35 and 36 projecting outwardly therefrom in diametric opposite directions. It will be noted that the crosshead 34 is mounted on the shaft 33 so that the arms 35 and 36 are arranged substantially at right angles with respect to the grass cutting blade 11 which is fixedly secured to the lower horizontal portion 15 of the bracket 16.

The crosshead 34 is also formed with a pair of spaced ears 38 which project rearwardly therefrom and are arranged substantially at right angles with respect to the arms 35 and 36, as shown in FIG. 7.

One end of an adjustable link 40 is pivotally connected to the ears 38 of the crosshead 34 by means of a pin 41 (FIG. 7), and the other end of said link is pivotally connected to the arm 42 of a Y-lever 43, by means of a pin 44 (FIG. 4).

Another arm 45 of the Y-lever 43 is pivotally connected to the bracket 16 by means of a pin 46, and the third arm 47 of the Y-lever 43 is pivotally connected to one end 48 of an adjustable link 49 by means of a pin 50. The other end 51 of the link 49 is pivotally connected to the end 52 of the plate 26 opposite to the end 29 thereof, by means of a pin 53.

In this manner the Y-lever 43 constitutes a motion translating means through which the crosshead 34 is operatively connected to the movable grass cutting blade 12, so that rectilinear movements of the crosshead 34 on the shaft 33 are transmitted by the link 40 to the Y-lever 43, and from thence through the link 49 to the plate 26 which is caused to swing about its pivot provided by the stud 18. Swinging movements thus imparted to the plate 26 are transmitted through the pin 27 to the movable blade 12, and the movement transmitting plate 26 on the pivot stud 18 has sufficient clearance to permit the movable blade 12 to cant relative to the fixed blade 11. It will be apparent from the above description that the contact pressure between the cutting edges of the blades 11 and 12 is proportionate to the determined canting of one of the blades. Therefore, to obtain a predetermined canting, the movable blade 12 is initially regulated, or set, to effect the desired contact pressure between the cutting edges of both blades. For example, the canting effect can be increased or decreased by turning the nut 19 on the stud 18 to increase or decrease the pressures of the springs 30 and 31 against the movable blade 12. After the desired contact pressure is established no further adjustment of the parts is usually necessary.

According to the present invention a new and improved means is provided for actuating the crosshead 34 to effect operation of the movable grass cutting blade 12 by the mechanism above described, and such improved means may comprise a pair of opposed bell crank levers 56 and 57 which have a common pivotal center on a bolt or pin 58 fixedly secured to the upper end portion of the shaft 33 in the manner shown best in FIG. 6.

The bell crank lever 56 includes an outwardly projecting leg 60 and an upwardly projecting leg 61, and the bell crank lever 57 is likewise formed with an outwardly projecting leg 62 and an upwardly projecting leg 63.

The outer end of the leg 60 of the bell crank lever 56 is provided with a pin 65 on which is mounted the upper end of a link 66. The lower end of the link 66 is connected to the outer end of the crosshead arm 35 by means of a pin 67.

In a similar manner the outer end of the leg 62 of the bell crank lever 57 if provided with a pin 68 on which is mounted the upper end of a link 69. The lower end of the link 69 is connected to the outer end of the crosshead arm 36 by means of a pin 70.

An elongated handle bar 71 has its lower end fixedly secured to the upper end of the leg 61 of the bell crank lever 56 by means of a pin 72, and an elongated handle bar 73 has its lower end fixedly secured to the upper end of the leg 63 of the bell crank lever 57 by means of a pin 74.

Figure 2:
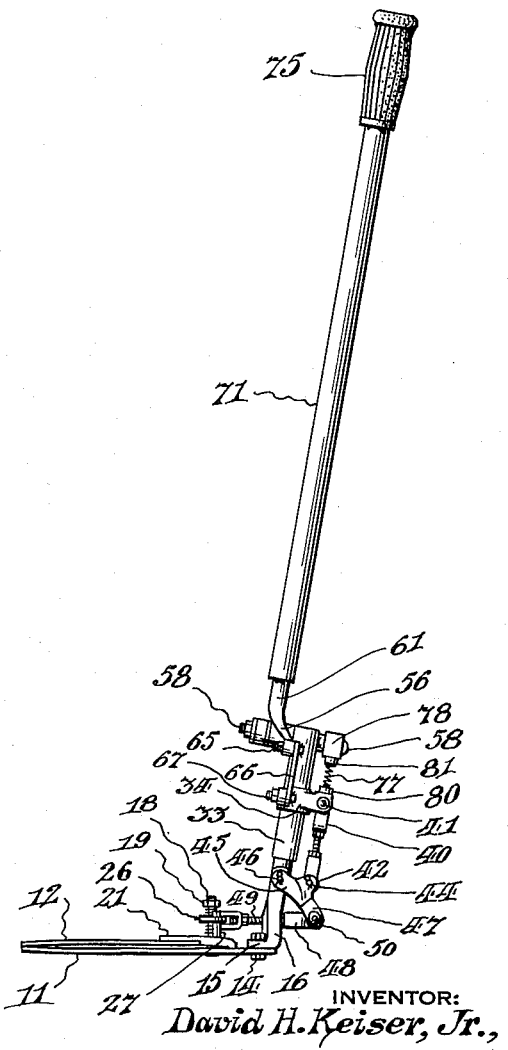
FIG. 2 is a side elevational view of the device.

As shown in FIGS. 1 and 2, the handle bars 71 and 73 are preferably in the form of substantially straight rods of considerable length, and at their upper ends said handle bars are fitted with hand grip elements 75 which are so disposed that the shears can be conveniently carried as well as operated by both hands of an individual while standing in a substantially upright position with arms extending downwardly and forwardly in a natural and comfortable manner. The distance between the centers of the hand grip elements 75 of the handle bars 71 and 73 to the center of the pivot pin or bolt 58, is about 20½ inches, and the distance between the center of the bolt 58 to the center of the pivot pins 65 and 68 is two inches, so that the hand operating power or force transmitted to the crosshead 34 by the intermediate leverage arrangement is in a ratio of about 20.5/2, or is approximately ten times greater than the force reciprocatively applied by the hands to the handgrip elements 75. This enables very easy and smooth grass cutting action of the device.

In FIG. 4 the movable grass cutting blade 12 is shown by full lines positioned at the completion of its closing shearing movement with the fixed grass cutting blade 11, and by broken lines in its wide open or normal non-operating shearing position. With the blades 11 and 12 thus illustrated in closed position, the several parts of the blade actuating mechanism, including the crosshead 34 and the Y-lever 43 are shown in FIGS. 3 and 5 in blade closed position, in which position the crosshead 34 is located near the upper end of the shaft 33 and the lower end of the arm 47 of the Y-lever 43 is disposed outwardly a considerable distance from the blade carrier bracket 16, due to the manner in which the Y-lever 43 is operatively connected to the crosshead 34 by the link 40. The closing movement of the movable grass cutting blade 12 is arrested by a stop lug 76 that is fixedly secured to the rear extension 11ᵃ of the fixed blade 11 by a depending stud projection 76ᵃ, and engaged by the lateral extension 25 of the movable blade bracket 21 in the manner shown in FIGS. 3 and 4.

When the movable grass cutting blade 12 is in the wide open position shown by broken lines in FIG. 4, the lower end of the arm 47 of the Y-lever 43 engages the blade carrier bracket 16 in the manner shown by broken lines in FIG. 3, and the swinging movement of the movable grass cutting blade 12 outwardly from the fixed grass cutting blade 11 is thereby arrested. In this manner the bracket 16 provides a stop for limiting the swinging movement of the Y-lever 43 when said lever is operated in the blade opening direction, and the lug 76 provides a stop for limiting the closing movement of the grass cutting blade 12.

A helical expansion spring 77 mounted between a spring cup 80 fixed to the crosshead ears 38 and a spring cup 81 fixed to a collar 78 secured on the fixed pivot bolt 58 normally acts to separate the handle bars 71 and 73 to a point where the lower end 47 of the Y-lever 43 is positioned against the bracket 16 and thus holds the grass cutting blades 11 and 12 in a predetermined open position relative to each other. In the inoperative shearing position of the blades, the two handle bars 71 and 73 are disposed in the angular arrangement shown in FIG. 1, in which position the hand grips 75 are spaced a predetermined wide distance apart, from which position they are adapted to be actuated in directions toward and from each other and thereby cause the toggle joint provided by the bell crank levers 56 and 57 and the links 66 and 69 to effect operation of the crosshead 34 and the motion translating unit operatively connected thereto in the manner above described, to accomplish the desired shearing movements of the grass cutting blades 11 and 12.

From the foregoing description it will be seen that by the present invention there is provided a substantially right angular unit which includes a pair of cooperatively mounted grass cutting blades that are positioned in adjacent substantially parallel relation above the ground. The invention also includes the provision of two elongated unit operating handle members which are pivotally connected with the upper portion of the unit for reciprocating unit operating movement toward and from each other and which extend from the unit to a location within the hand grasping reach of an individual standing in a substantially vertical or erect position. Another feature of the present invention is the provision of the new and improved mechanism for effecting grass cutting operation of the blades, including a horizontally movable element which is connected with one of the grass cutting blades, a vertically movable element which is operated by the action of the handle members, and a pivotally mounted motion translating lever to which said elements are connected.

Of course, it will be apparent to those skilled in this art that the improvements specifically shown and described can be changed and modified in vairous ways without departing from the invention herein disclosed, the spirit and scope of which is more particularly indicated and defined by the hereto appended claims.

I claim:

A grass cutting device of the class described, comprising a substantially right-angular unit which includes a pair of cooperatively mounted grass cutting bades that are positionable in adjacent substantially horizontal relation above the ground and a mechanism for effecting grass cutting operation of said blades, a shaft fixedly mounted on said unit and upstanding therefrom in a substantially vertical direction, a crosshead slidably mounted on said shaft for operating said mechanism, a pair of opposed bell crank levers having a common pivoting center with said shaft at a point above said crosshead, each said bell crank lever having a pair of legs, one leg projecting outwardly from the pivoting center of the bell crank lever with the shaft, and the other leg projecting upwardly from the pivoting center of the bell crank lever with the shaft, means operatively connecting the outwardly projecting leg of each bell crank lever with said crosshead, and an elongated handle bar rigidly connected to the end of the upwardly projecting leg of each bell crank lever and extending upwardly therefrom to a location within the hand grasping reach of an individual standing in a substantially erect position, whereby said handle bars are adapted to be operated toward and from each other for effecting grass cutting operation of said blades while the individual is standing in said position.

References Cited in the file of this patent

UNITED STATES PATENTS

| Number | Name | Date |
|---|---|---|
| 851,708 | Taylor | Apr. 30, 1907 |
| 873,333 | Sweet | Dec. 10, 1907 |
| 1,072,151 | Norcross | Sept. 2, 1913 |
| 1,556,188 | Wilkinson | Oct. 6, 1925 |
| 1,585,572 | Takacs | May 18, 1926 |
| 1,799,624 | Goodwin | Apr. 7, 1931 |
| 1,845,798 | Keiser | Feb. 16, 1932 |
| 1,869,295 | Atterbury | July 26, 1932 |
| 1,944,917 | Bergmann | Jan. 30, 1934 |
| 2,281,977 | Keiser | May 5, 1942 |
| 2,534,924 | Northquist | Dec. 19, 1950 |
| 2,564,148 | Broderick | Aug. 14, 1951 |
| 2,607,114 | Keiser | Aug. 19, 1952 |
| 2,661,534 | Keiser | Dec. 8, 1953 |